(12) United States Patent
Nguyen et al.

(10) Patent No.: US 6,406,360 B1
(45) Date of Patent: Jun. 18, 2002

(54) DEVICE FOR CLEANING VULCANIZATION MOLDS

(75) Inventors: Nhu Vinh Nguyen; Martin Gonschior, both of Hannover; Robert Pohlmann, Bad Arolsen; Heinz Köhler, Frankenberg; Marc Rapin, Ernestviller; Karsten Wenzel, Helpsen; Leo Pontzen, Aachen; Heinrich Schnell, Korbach; Holger Brandt, Hannover; Wolfgang Kuhr, Aachen, all of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/631,118

(22) Filed: Aug. 2, 2000

(30) Foreign Application Priority Data

Aug. 4, 1999 (DE) .......................... 199 36 698

(51) Int. Cl.⁷ ................................. B24C 3/00
(52) U.S. Cl. ................ 451/75; 451/92; 451/102; 451/310
(58) Field of Search ................ 451/75, 92, 102, 451/310, 490, 524, 920

(56) References Cited

U.S. PATENT DOCUMENTS

| 3,825,965 A | * | 7/1974 | Root et al. |
| 3,905,155 A | * | 9/1975 | Smith et al. |
| 4,045,915 A | * | 9/1977 | Gilbert et al. |
| 5,932,026 A | * | 8/1999 | Trampusch |

FOREIGN PATENT DOCUMENTS

| DE | 19535557 | 3/1997 |
| DE | 19712513 | 10/1998 |
| DE | 19830397 | 1/2000 |

* cited by examiner

Primary Examiner—Joseph J. Hail, III
Assistant Examiner—Willie Berry, Jr.
(74) Attorney, Agent, or Firm—Smith, Gambrell & Russell, LLP

(57) ABSTRACT

A device for cleaning the inner walls of vulcanizing molds that are divided into upper and lower partial molds by means of a blasting device/nozzle and a manipulating device, with the blasting device and the manipulating device being accommodated and encapsulated in an isolation hood that is provided with an adapter ring, and with the isolation hood being suspended on a movable boom and connectable to the outer circumference of a partial mold by means of the adapter ring.

17 Claims, 5 Drawing Sheets

Figure 1A:
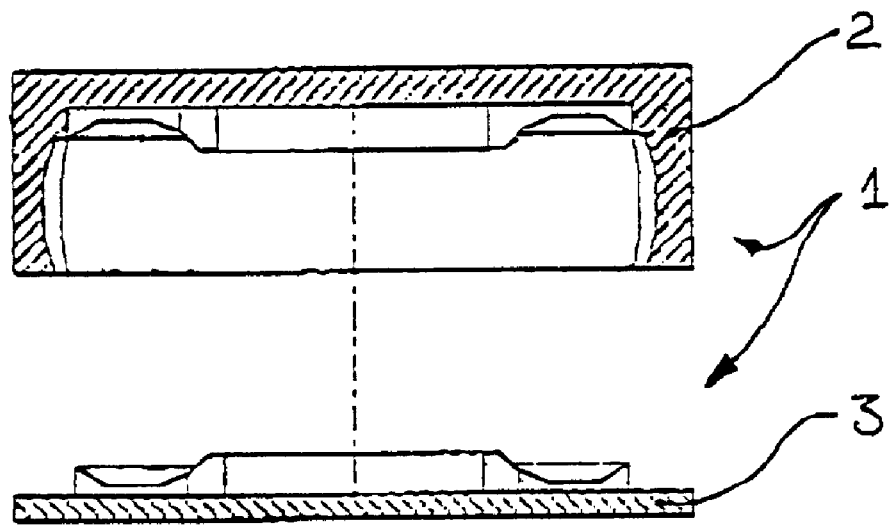

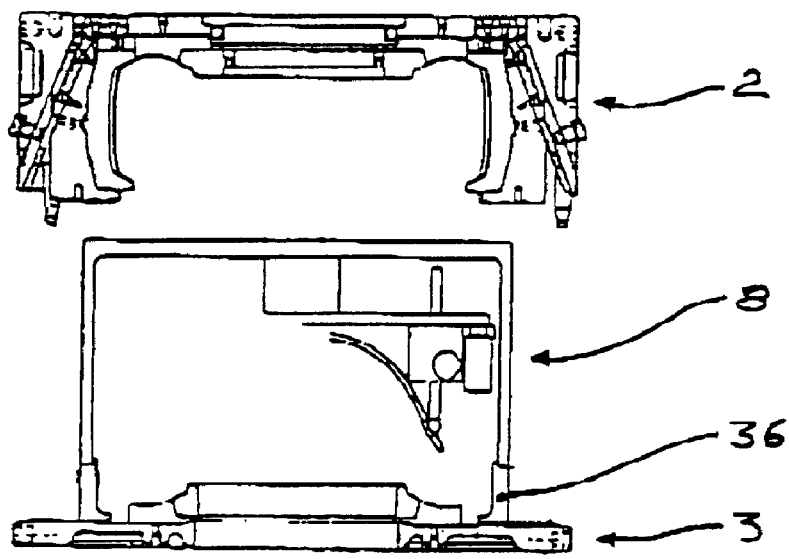
Fig. 4a
Fig. 4b
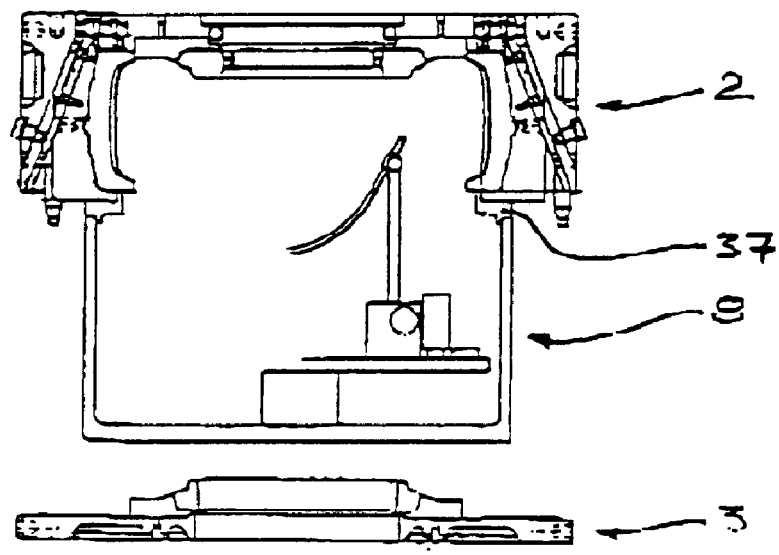

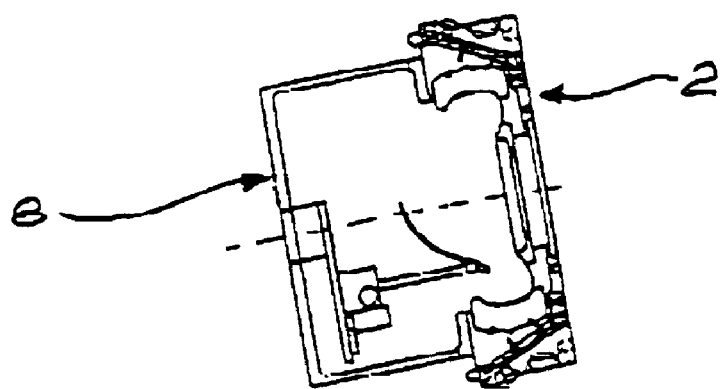
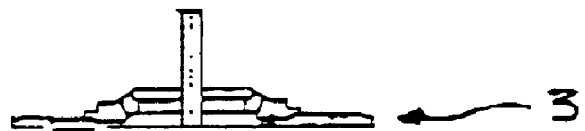
Fig. 5a
Fig. 5b
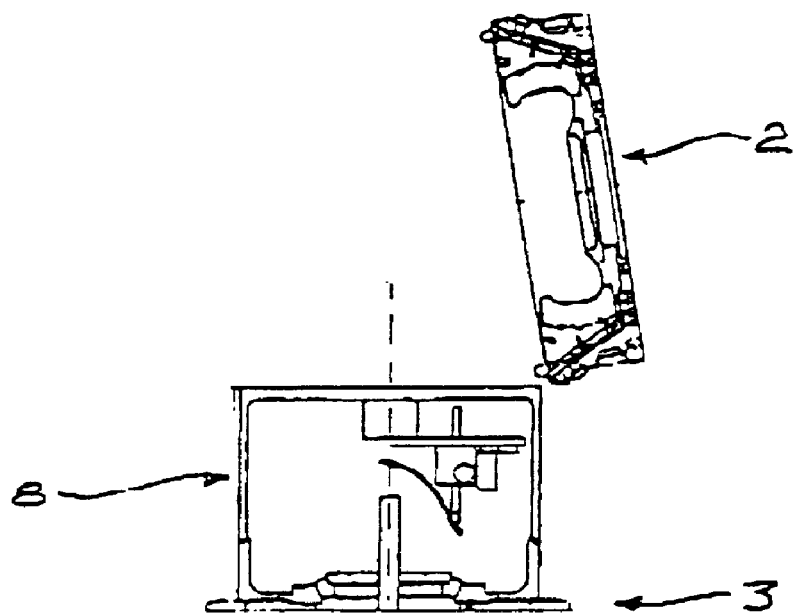

DEVICE FOR CLEANING VULCANIZATION MOLDS

INTRODUCTION AND BACKGROUND

The invention pertains to a device for cleaning, in particular for dry ice cleaning, the inner walls of vulcanization molds for tires, said molds being divided for opening into upper and lower partial molds, said cleaning being by means of a blasting material, with a movably provided blasting material device/nozzle, moved along at least four axes by means of a manipulation device, for application of blasting material to the inner walls, and with a device designed as an isolation hood for encapsulation of the blasting material application device and of the thereby cleaned inner walls with respect to the environment, where the isolation hood can be tightly joined at the outer perimeter to a partial mold and has openings and leads for supply elements for power, compressed air and blasting material.

For cleaning the inner surface or the inner walls, respectively, of molds and tools used in industry, essentially meaning those made of metal, different types of chemical and physical cleaning methods and means are known.

Whereas the chemical cleaning method places strict demands—specified by legal statutes—on the safety and disposal equipment due to the aggressive media often used, with regard to physical cleaning methods in which the impurities, as a rule, are removed from the surface to be cleaned by sandblasting or by directing blasting material composed of sand, metal or glass particles thereon, it is necessary that the cleaning itself be carried out in special cabinets, so that the component to be cleaned first has to be removed from the corresponding machine and has to be placed into such cabinet.

An additional alternative consists in that the components can be cleaned by exposure to high-velocity dry ice pellets, that is, small, dry ice particles about the size of a grain of rice. With dry ice we are delaying with carbon dioxide cooled to at least $-78.5°$ C. and converted into the solid state, which has the advantage that under atmospheric pressure it passes directly from the solid phase into the gas phase, with no melt liquid being produced. Thus, in a particularly simple manner, namely with normal compressed air, both the exposure to high-velocity dry ice and also the removal and disposal of dirt particles takes place.

When using high-speed dry ice pellets, several favorable effects will occur. In addition to the initially occurring mechanical removal of dirt and impurities by means of abrasion, a powerful, point-wise cooling of the exposed region will occur, so that the impurities, and in particular the rubber residues in tire molds, will become embrittled and are easier to remove. In addition, upon impact of the dry ice pellet against the surface under atmospheric pressure, the already mentioned transition of the dry ice to the gaseous state occurs, so that a roughly 700-fold increase in volume of the dry ice will occur. The gas cloud produced in this manner is able to blow out the subcooled and embrittled impurities, without itself damaging the substrate or the surface itself.

However, with dry ice cleaning exceptionally large sound emissions occur, and it is therefore necessary to supply and then subsequently to eliminate a large quantity of compressed air mixed with dry ice, carbon dioxide or dirt. In this case as well, it is necessary either to treat the component being cleaned in special cabinets, or in the event that the component is to be cleaned in situ, to shield the environment in a very cost-intensive manner against the emissions of the dry ice cleaning method.

In addition, many cleaning methods, in particular the cleaning of vulcanization molds for tires, have to proceed rather quickly so that production stoppages will be avoided. In addition, vulcanization molds for tires are very hot, even for some time after removal of the vulcanization material, so that removal of the molds and their transport into a separate cabinet can occur only after cooling, and this takes a considerable amount of time. Thus, cleaning is very difficult and sometimes cannot even be carried out by manually operated blasting material systems within the vulcanization press (in situ) due to the aforementioned emissions and the heat.

DE 197 12 513 A1 discloses a method and a device for cleaning an inner wall of a mold by means of dry ice, where the cleaning can take place within the vulcanization press, without the vulcanization mold having to be dismantled.

The vulcanization molds for tires, as a rule, are designed as partial molds which can be opened after the vulcanization process. In this case, on the one hand there segmented molds, which usually have an upper mold which surrounds the vulcanized tire on one side and on the road strip or tread, and which feature laterally adjustable segments, in the tread region for closing the mold, and which comprise a lower mold (side dish) with which the mold is closed and the remaining tire side is shaped and vulcanized.

On the other hand, there are two-partial molds which are nearly identically designed without displaceable segments, and each forms one side wall and covers roughly half of the tread region.

With regard to the device disclosed in DE 197 12 513 A1, encapsulation of the region being cleaned is used, which takes place by means of the two partial molds and of a possibly telescoping or bellows-like mantle, so that the mantle or the encapsulation also contains the blasting material device.

The disadvantage of this kind of encapsulation consists in that a complete encapsulation can only take place when the mantle is stretched between two partial molds and is fixed to them and held in place, so that the movement of the encapsulation up to the still hot molds requires a considerable amount of manual effort and also can only be carried out after a longer cool-down time. In this case, the encapsulation or the mantle must be flexible enough so that different positions of the two partial molds relative to each other can be handled, and yet still a movable lateral opening for a robot arm is provided, which causes the overall structure to be very complex.

The heat radiation, with the heating of robot devices/controls to over 60°, makes the use of industrial robots problematic, and in addition, requires a spatial repositioning or new reading of the precise robot standpoint based on three reference points before each cleaning a mold, which requires a reprogramming before each new cleaning process, unless stationary or at least rail-based robot devices are used, but these, in turn, disrupt the normal production sequence.

Document DE 195 35 557 A1 discloses a device for cleaning an inner wall of a mold with dry ice pellets, with a cover hood matching the opening cross section of the mold, through which at least the supply lines extend, and which has in its edge region at least one elastic seal for placement against the mold. However, the disadvantage of this device is not only that all handling devices for adjusting the jet nozzle, but also for adjusting the cover hood are placed at a central carrier passing through the cover hood, with parts of the central carrier and several actuating devices, especially those for height adjustment of the nozzle, being located outside and beneath the cover hood. Thus, the design height of the entire device has to be increased to such an extent that in-situ cleaning, at least of tire molds for smaller tires, is not possible. In addition, a number of rotary transmission lead throughs equipped with bearings are required in the cover hood, so that the weight of the device is increased and its handling is made more difficult.

Thus one problem for the invention was to design a device for cleaning the inner walls of molds by means of blasting material, in particular for dry ice cleaning of the inner regions of vulcanization molds, which can be employed in situ—i.e., in the vulcanization press after opening the molds and without waiting out the cooling time, which allows a dependable and complete encapsulation of the high-speed material or cleaning regions, which can be installed in a simple manner without manual activity and with which any kind of partial molds of vulcanization molds of very different dimensions and press types, for example, within hoist and pivoted presses, can be cleaned regardless of their positions relative to each other.

This problem is solved by the properties of the main claim. Additional favorable embodiments are presented in the subclaims.

In this case, the isolation hood is suspended from an extender arm of a transport device moving essentially transverse to its axis and extending essentially horizontally, and it is equipped with a replaceable adapter ring located in the region of its opening for making a tight connection with the outer perimeter of a partial mold, so that the blasting material device and the manipulation device are held in and are fully encapsulated within the blasting material space or cleaning space formed by the partial mold, adapter ring and isolation hood.

Due to this kind of design, in which the opening the isolation hood is pressed only against one partial mold or against its outer perimeter to form a seal by means of an adapter ring, a thorough automation of the cleaning process can be achieved without additional manual activity, where moreover, the region to be encapsulated is minimized and is limited essentially to the dimensions of the opened press. With this kind of design, in which the insulating hood is suspended from a moving extender arm of a transport device extending essentially transverse to its axis, it is possible, immediately after opening the vulcanization press and removing the tire, to attach first the isolation hood and the cleaning devices present in it, e.g., to the upper partial mold, then to clean it, thereafter to interrupt the cleaning process and in the same manner, after replacement of the adapter ring, to set the isolation hood on the lower partial mold by simple turning and repositioning, whereupon it can also be cleaned. Now in this case, because of the moving extender arm, which can be locked in any position, it makes no difference whether the vulcanization press is a hoist press, which vertically separates the upper or lower mold in one axis, or whether it is a pivoted press in which, for example, the upper mold is hinged to pivot upward.

By means of the replaceable adapter ring located in the region of its opening, the isolation hood is suitable for making a sealed connection to the outer perimeter of any particular partial mold. By means of these adapter rings, the isolation hood, or its connection opening, can be adapted to any particular mold dimensions and shaped, for example, to the connection dimension or to the outer perimeter of segmented molds, or of two-partial molds of differing dimensions and different surface shapes at their edge regions. In this case, the adapter ring can have, for example, a perimeter gasket in the region of its connection to the partial mold, and said gasket can be pressed against the partial mold, or it can even be designed so that its connection region is complementary to the surface shape of the partial mold.

Preferably, the isolation hood has a lead for a vacuum line for dirt particles and/or blasting material that accumulates during cleaning. In the case of dry ice cleaning, this suction is reduced to the suction of compressed air, or to a single exhaust line, since due to the sealed connection of the isolation hood to only one partial mold at a time, a small pressure space is produced from which the gaseous carbon dioxide introduced by compressed air in the form of dry ice pellets, plus the dirt, can be removed.

In one simple design, this kind of exhaust line can be designed as a tubular channel equipped with a gas-permeable filter, for example, in the base region of the isolation hood, so that the inner pressure in the blasting material or cleaning space, and thus the pressure force needed to press the adapter ring against the mold, is reduced.

Preferably, the blasting material device/nozzle provided on the manipulator device can move in four axes, and a) the manipulation device is designed to rotate within the isolation hood and around the vertical axis of the isolation hood or an axis parallel to this axis, and b) has a support arm extending into the vicinity of the inner wall of the isolation hood, there being on said arm a carriage designed to move essentially horizontally, i.e., across the isolation hood, and where c) the skid has a lifting bar moving essentially vertically, i.e., parallel to the vertical axis of the isolation hood, where d) the lifting bar has at its upper end, i.e., at the end facing the partial mold to be cleaned, a pivoted device holding the blasting material device/nozzle, with its pivot axis aligned essentially at right angles to the vertical axis of the isolation hood and at right angles to the vertical movement of the skid.

Due to this particular design of the device, it is possible to clean accurately a large number of mold designs (upper mold and lower mold) and mold dimensions, even when the isolation hood is connected via the different adapter devices or adapter rings to molds whose outer perimeter does not correspond to the perimeter of the isolation hood. The outlet cross section of the nozzle, in every case, can be placed in such proximity to the inner surface of the mold and then controlled so that optimum application distances of the blasting material, or optimum application angles of the blasting material can be achieved, and successive surface regions can be cleaned according to a previously defined grid.

Preferably, the isolation hood located above an extender oh the transport device is designed as moving in five axes, wherein d) the extender arm can move or telescope in the direction of its axis and in essentially horizontal translation, and also e) it is designed to move perpendicular to its axis and can move in essentially vertical translation and can rotate about its axis, wherein f) the isolation hood is cardan suspended at the end of the extender arm.

Due to the suspension of the isolation hood from an extender arm designed in this manner, the isolation hood with the adapter ring can be very easily attached to partial molds of different press types, for example, equally to molds that are pressed apart in only the vertical direction, and to molds in hinged pivoted presses, which can assume any particular slanting spatial position in the opened state.

Now just as is the case for the movements in four axes of the manipulation or blasting material device, all movements in the five axes are controlled and. definable, so that, for example, by simple means adjustment of the level between the transport device and partial mold or press is possible; also adjustment of the angular position of the isolation hood plus adapter device is possible for a tipped/pivoted upper mold (partial mold), and rotation for connection to the lower mold (partial mold) is also possible. In addition, it is desirable to design one or more of the bearings as resilient bearings to compensate for position differences in the connecting or docking process to the partial molds, for example, as resilient sliding bearings with leaf springs.

To improve the sound isolation, the isolation hood is designed as a special sound suppression hood, where essentially its walls are equipped with sound-absorbent materials. This can be done such that the isolation hood is of double-wall design and the space between the walls is filled with sound-absorbing material, such as special foam, or it can be done such that rubberized sound-absorbent mats are placed on the inside of the isolation hood. Of course, it is also possible to design the isolation hood itself to be of sound-absorbent material, which as already mentioned above, can additionally be at least partially gas-permeable and can have filter properties.

One particularly favorable design of this kind of sound-absorbent hood consists in that the isolation hood is designed as a polygon, preferably as a rectangle, where the adapter ring then represents the transition from the polygonal shape of the isolation hood to the adjoining shape of the vulcanization mold to be cleaned. Thus, by comparison to a circular shape, the result is a much improved sound isolation or sound absorption due to the more diffuse reflections and interferences of the sound waves within the polygon. With this kind of design we have a much improved resonance behavior in the sense of a reduction in resonance.

In yet another favorable design, the device features one central, or possibly several dependent, control devices and appurtenant sensor devices for all movement axes. Thus, the overall sequence of the cleaning process or parts thereof can be automated in a simple manner.

In yet another favorable design, the transport device is designed as a floor-mounted and free-moving cleaning cart, so that cleaning and access through normal transport and access routes is possible, without complicated rail or traverse guides.

The invention will be explained in greater detail below, based on one example illustrated in the figures. We have:

FIG. 1a A segmented mold consisting of upper and lower mold

Figure 1B:
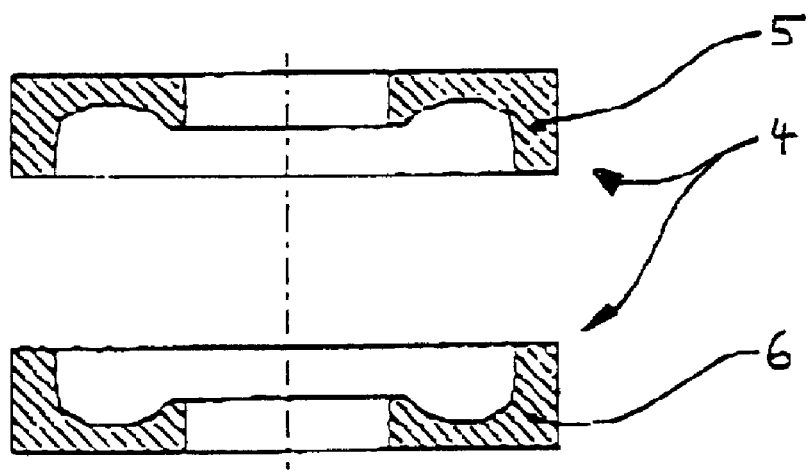

FIG. 1b A two-partial mold consisting of upper and lower mold

Figure 2A:
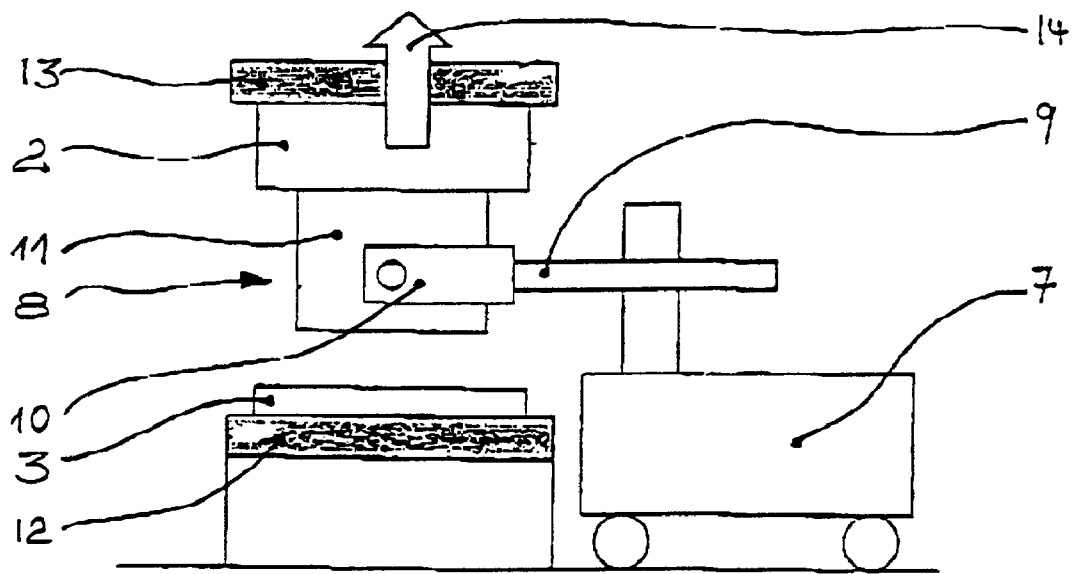
Figure 2B:
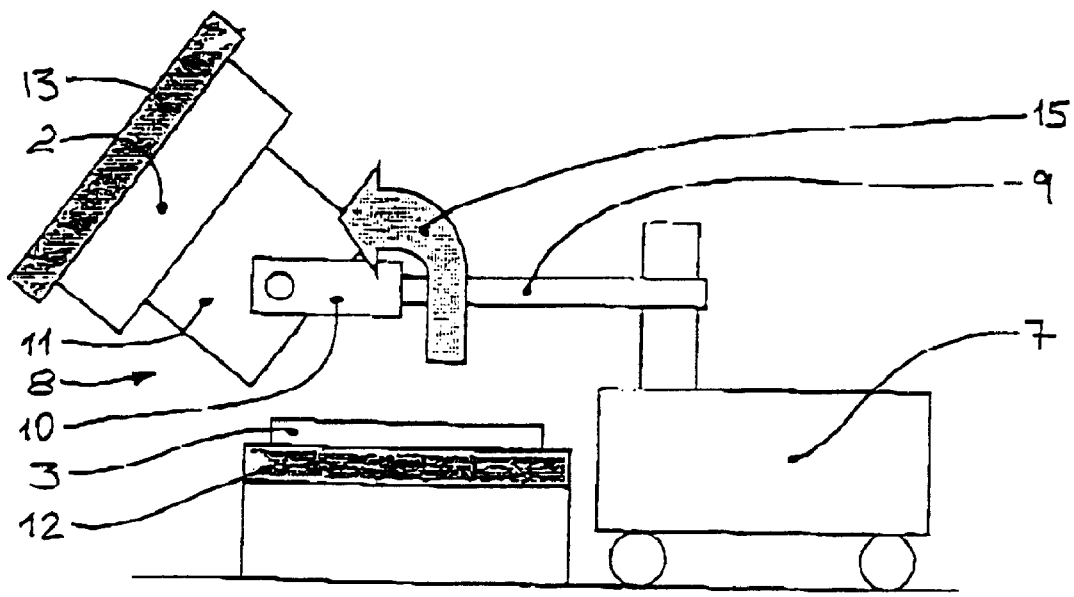
Figure 3:
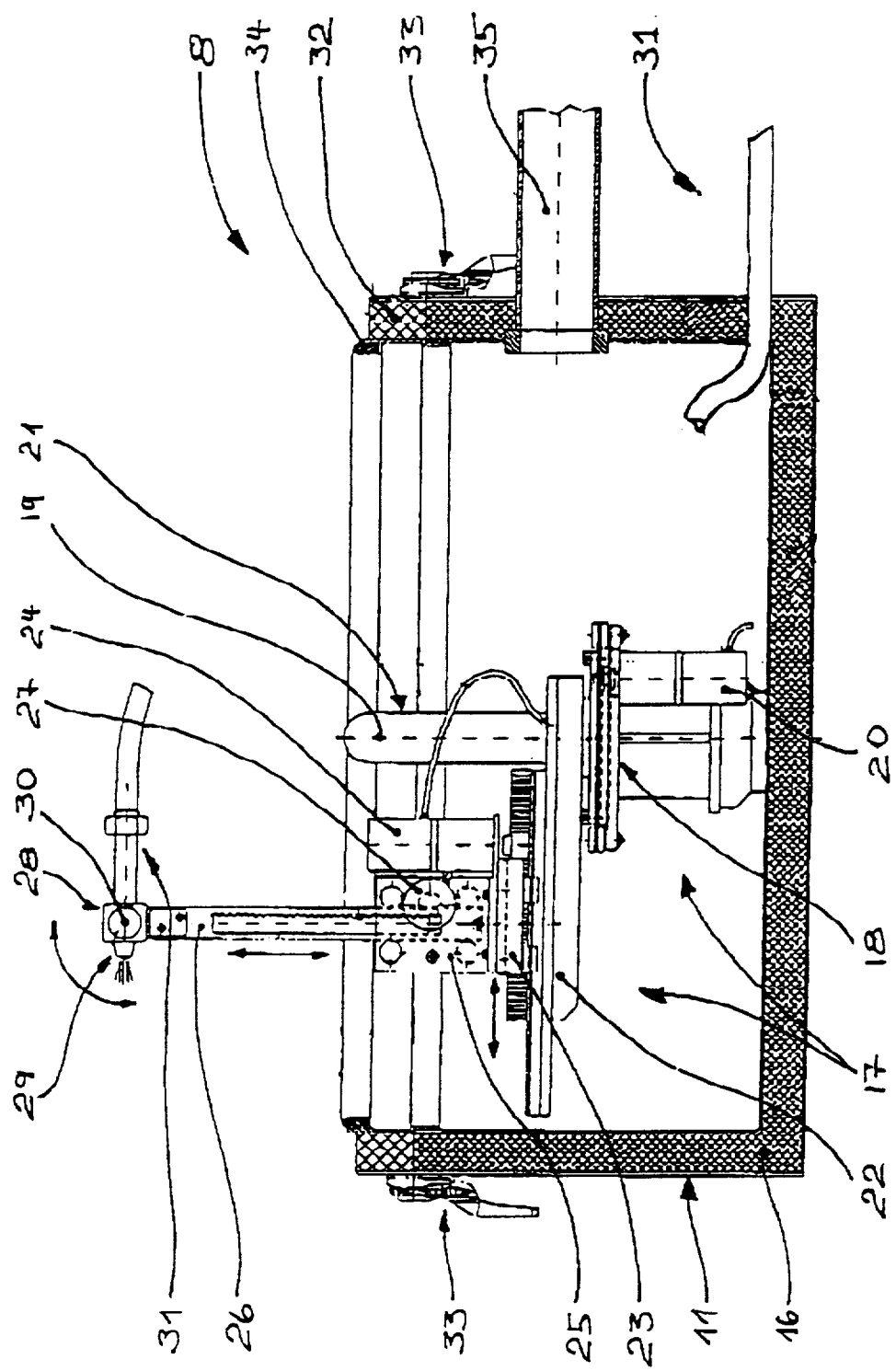

FIG. 2a A basic sketch of the invented device for cleaning an upper mold in a vertically displaceable press FIG. 2b A basic sketch of the invented device for cleaning an upper mold in a press with hinges that opens using a pivoting movement FIG. 3 The invented device with isolating hood shown in cross section FIG. 4a A device set into the lower mold of a segmented mold with a press opening with a vertical hoist movement FIG. 4b A device according to this invention set upon the upper segmented mold in the same press as in

FIG. 4a

FIG. 5a Use of a device according to this invention for cleaning an upper segmented mold of a pivoted press FIG. 5b Use of the device according to this invention for cleaning the lateral mold of a pivoted press equipped with a segmented mold.

FIGS. 1a and 1b show the types of molds most used today for vulcanizing tires. In this case, FIG. 1a shows one so-called segmented mold 1, consisting of an upper partial mold 2 and one lower partial mold 3. Thus, after insertion of the rough tire blank and after closing the upper and lower partial molds, the upper partial mold forms a side wall with its upper region and its perimeter regions form the tread of the vulcanized tire, while the lower partial mold, also called the sidewall shell, forms the other sidewall of the tire under the pressure and heat of vulcanizing. The perimeter regions of the upper partial mold are divided, in this case, into single circular segments, which likewise can be easily opened before insertion of the rough tire blank and can be closed for vulcanizing (not illustrated in any detail here).

With regard to the cleaning requirement, it is in this case essential only that the upper partial mold be a relatively deep partial mold, and surround the rough tire blank or the tires on three sides. Cleaning this partial mold can be particularly difficult when the molds have to be disassembled due to the voluminous mold element.

FIG. 2 however, shows the two-part mold 4 with the upper partial mold 5 and the lower partial mold 6.

Both partial molds of a two-part mold surround only one side wall and about half of the road tread region, where because of the shaping, additional segmenting of the perimeter regions of the partial molds can be omitted.

Both the segmented mold 1 and also the two-part mold 4 are installed within an open press mouth of a vulcanization press (not illustrated here) and can be closed by using the press after insertion of the rough tire blank, then placed under internal pressure and heated.

FIG. 2a shows a device 8 according to this invention, located on a cleaning cart 7 set on the floor and moving freely, used for cleaning an upper partial mold 2 of a segmented mold according to the basic sketch of

FIG. 1a.

Here we can see the isolation hood 11 of the invented device, suspended from a moving extender arm 9 by means of a cardan suspension 10, and the isolation hood is closed by pressing its adjoining opening against the outer perimeter of the partial mold 2.

In this case, the upper and lower partial molds 2 and 3 are held in a press platen 12 or in a press plunger 13 (not shown) of a vulcanization press, which together form the press. The press plunger 13 can be elevated in this vulcanization press in the opening direction 14 for insertion and removal of the tire or also for cleaning.

FIG. 2b shows the basic sketch of the corresponding use of a cleaning device 8 according to this invention, for cleaning the upper partial mold 2 of a segmented mold 1, but where the upper press platen 12 can pivot within a pivoted press in the opening direction 15.

Here, too, the invented device is again mounted via a cardan suspension 10 and an extender arm 9 to a floor-mounted cleaning cart 7, so that because of the moving extender arm and the cardan suspension, the isolation hood 11 can be connected, without difficulty, by its adjoining opening to the outer perimeter of the partial mold 2.

FIG. 3 shows a cross section of the device according to this invention. Here we see first the double-wall isolation hood 11, which is designed as a rectangular sound absorbing hood with inserted sound absorbent material 16 between the doubled walls.

Within the isolation hood there is a manipulation device 17, which is located centrally on a base plate 18 within the isolation hood and can rotate about the vertical axis 19 of the isolation hood. The rotation is effected by means of a stepping motor 20, which can rotate the corresponding, supported upper part of the base plate by about 370° forward and back.

Above the base plate 18 the manipulation device 17 has a support arm 22 associated with a central guide 21, and said arm is designed to rotate with the upper part of the base plate and extends up to near the inner wall of the isolation hood. On the support arm there is a carriage 23 designed to move essentially horizontally, i.e., across the isolation hood, and is driven by means of a stepping motor 24 using rack and pinion gearing and is guided on the support arm by means of roller guides (not shown in detail) to move radially within the mold or within the isolation hood.

The carriage likewise contains a holder 25 for a lifting bar 26, which can be moved essentially vertically, i.e., parallel to the vertical axis of the isolation hood. The moving lifting bar will likewise be driven via a stepping motor 27 and via a rack and pinion gearing and is guided by means of a guide roller (not illustrated in detail here) in its axial movement within the holder.

At the upper end of the lifting bar 26, that is, facing the partial mold to be cleaned, there is a pivoted device 28 which holds the blasting material device/nozzle 29. Likewise, the pivoted device can be driven and can pivot, by about 100° about a pivot axis 30 aligned essentially at right angles to the vertical axis of the isolation hood and at right angles to the vertical movement of the carriage.

Supply of the blasting material device with compressed air and dry ice pellets is effected here, via flexible supply lines 31 (not illustrated in detail).

The isolation hood 11 features at its upper edge and in the region of its opening, a replaceable adapter ring 32 which can be connected to the isolation hood by means of clamping or snapping mechanisms 33.

The adapter ring 32 contains a sealing ring 34, and the shape and dimensions of the adapter ring and sealing ring permit pressing against the outer perimeter of a partial mold to create a seal.

In addition, the isolation hood has a lead for a vacuum line 35 that is used to suck away the dirt particles and/or compressed air and blasting material occurring during cleaning.

FIGS. 4a and 4b, once again, show the basic use of a cleaning device 8 according to this invention, for cleaning the upper and lower partial molds 2 and 3 of a segmented mold. Also, we clearly see here the different adapter rings 36 and 37, each provided to form a tight seal at the outer perimeter of the upper or lower partial mold, and which are used to hold and to encapsulate fully the blasting material device (with the differently designed upper and lower molds shown here) and the manipulation device within the blasting material space or cleaning space formed by partial mold, adapter ring and isolation hood.

FIGS. 5a and 5b present the basic illustration of a corresponding use of the invented device 8, for a segmented mold located in a pivoted press, in which the upper and lower partial molds 2 and 3 can be opened by a pivoting motion.

LIST OF REFERENCE SYMBOLS

1 Segmented mold
2, 3 Upper and lower partial mold
4 Two-part mold
5, 6 Upper and lower partial mold
7 Cleaning cart
8 Cleaning device
9 Extension arm
10 Cardan suspension
11 Isolation hood
12 Press platen
13 Press plunger
14, 15 Opening direction
16 Sound-absorbent material
17 Manipulation device
18 Base plate
19 Vertical axis of isolation hood
20 Stepping motor
21 Central guide
22 Support arm
23 Carriages
24 Stepping motor
25 Holder
26 Lifting bar
27 Stepping motor
28 Pivoted device
29 Blasting material device
30 Pivot axis
31 Supply for compressed air/dry ice/power
32 Adapter ring
33 Clamping/snap mechanism
34 Sealing ring
35 Vacuum line
36, 37 Adapter ring

What is claimed is:

1. A device for cleaning the inner walls of a tire vulcanizing mold that is divided into upper and lower mold parts by means of a blasting material, comprising a blasting nozzle for blasting the inner walls which nozzle is arranged such that it can be moved in at least four axes by a manipulating device, and with a device for encapsulating the blasting nozzle, the inner walls of said tire mold being blasted relative to its surroundings which is in the form of an isolation hood, with the isolation hood being connectable in a sealed fashion to the outer circumference of one of said partial molds and containing openings as well as leadthroughs for line elements that serve for supplying power, compressed air and the blasting medium, the isolation hood being movably suspended on a movable boom of a transport device which essentially extends horizontally and transverse to axis of the isolation hood, with the isolation hood being provided in the vicinity of its opening with an exchangeable adapter ring for producing a sealed connection with the outer circumference of only one of a partial mold such that the blasting device and the manipulating device are accommodated and encapsulated in their entirety within a blasting or cleaning space formed by one of the partial molds, the adapter ring and the isolation hood, the adapter ring including exchangeability against adapter rings of different shapes.

2. The device according to claim 1, further comprising the blasting nozzle being arranged on the manipulating device such that it can be moved in four axes, with
   a) the manipulating device being arranged inside of the isolation hood such that it can be turned about a vertical axis of the isolation hood or about an axis that extends parallel to said vertical axis, and with
   b) the manipulating device containing a carrying arm that extends into the vicinity of an inner wall of the isolation hood, with a carriage that can be displaced essentially transverse to the isolation hood, being arranged on said carrying arm, wherein c) the carriage contains a lifting beam that can be displaced essentially in the vertical direction to be parallel to the vertical axis of the isolation hood, and wherein d) the lifting beam contains a pivoting device that accommodates the blasting nozzle on its upper end which faces a partial mold to be cleaned, with the pivot axis of the pivoting device essentially being aligned transverse to the vertical axis of the isolation hood and tranverse to the vertical movement of the carriage.

3. The device according to claim 2, further comprising the isolation hood being arranged on the transport device by means of a boom such that it can be moved in five axes, with a) the boom being translationally displaced or telescoped, essentially horizontally, in the direction of its axis, as well as b) being translationally displaced, essentially vertically, perpendicular to its axis, as well as being turned about its axis, and with c) the isolation hood being cardanically suspended on the end of the boom.

4. The device according to claim 3, further comprising at least one central control device and at least one corresponding sensor device for each axes of movement.

5. The device according to claim 2, wherein the adapter ring and/or the isolation hood is in the form of a sound protection ring or sound protection hood, with a sound-absorbing material being essentially provided on walls of the hood.

6. The device according to claim 5, wherein the isolation hood is in the form of a polygon.

7. The device according to claim 2, further comprising at least one central control device and at least one corresponding sensor device for each axes of movement.

8. The device according to claim 1, further comprising the isolation hood being arranged on the transport device by means of a boom such that it can be moved in five axes, with a) the boom being translationally displaced or telescoped, essentially horizontally, in the direction of its axis, as well as b) being translationally displaced, essentially vertically, perpendicular to its axis, as well as being turned about its axis, and with c) the isolation hood being cardanically suspended on the end of the boom.

9. The device according to claim 8, wherein the adapter ring and/or the isolation hood is in the form of a sound protection ring or sound protection hood, with a sound-absorbing material being essentially provided on walls of the hood.

10. The device according to claim 9, wherein the isolation hood is in the form of a polygon.

11. The device according to claim 8, further comprising at least one central control device and at least one corresponding sensor device for each axes of movement.

12. The device according to claim 1, wherein the adapter ring and/or the isolation hood is in the form of a sound protection ring or sound protection hood, with a sound-absorbing material being essentially provided on walls of the hood.

13. The device according to claim 12, wherein the isolation hood is in the form of a polygon.

14. The device according to claim 12, further comprising at least one central control device and at least one corresponding sensor device for each axes of movement.

15. The device according to claim 1, further comprising at least one central control device and at least one corresponding sensor device for each axes of movement.

16. The device according to claim 1 wherein the isolation hood contains a lead-through for a suction line that serves for removal by suction of dirt particles and/or blasting medium accumulated during a cleaning process.

17. The device according to claim 1 wherein the transport device is in the form of a corridor-bounded and freely movable cleaning vehicle.

* * * * *